United States Patent [19]

Taylor et al.

[11] Patent Number: 4,481,614
[45] Date of Patent: Nov. 6, 1984

[54] VELOCITY CORRECTION APPARATUS FOR DISC RECORD PLAYER

[75] Inventors: Byron K. Taylor, Carmel; Myron C. Stewart, Coatesville, both of Ind.

[73] Assignee: RCA Corporation, New York, N.Y.

[21] Appl. No.: 366,644

[22] Filed: Apr. 8, 1982

[51] Int. Cl.³ .......................................... G11B 21/26
[52] U.S. Cl. ...................... 369/43; 369/126; 369/170; 369/256
[58] Field of Search ................. 369/43, 126, 135, 136, 369/138, 139, 170, 171, 172, 256; 358/322, 338, 907

[56] References Cited

U.S. PATENT DOCUMENTS

| | | |
|---|---|---|
| 3,917,903 | 11/1975 | Taylor et al. . |
| 3,956,581 | 5/1976 | Taylor . |
| 3,983,318 | 9/1976 | Miller et al. . |
| 4,030,124 | 6/1977 | Allen . |
| 4,160,268 | 7/1979 | Goto et al. . |
| 4,170,783 | 10/1979 | Tajima . |
| 4,366,563 | 12/1982 | Riddle .................................. 369/43 |

Primary Examiner—Donald E. McElheny, Jr.
Attorney, Agent, or Firm—E. M. Whitacre; J. S. Tripoli; E. P. Herrmann

[57] ABSTRACT

A velocity correction apparatus for a disc record player includes a permanent magnet attached to a cartridge mounted pickup arm and an electromagnetic coil secured in a cartridge supporting carriage. The coil is fixed to a supporting member which conformally engages structural features of the cartridge to guarantee proper alignment of coil and magnet. The coil support is mounted to permit limited rotation thereof to facilitate installation of the cartridge in the carriage and is mechanically biased to maintain coil-cartridge engagement and to maintain the cartridge in its normally operative position in the carriage.

10 Claims, 3 Drawing Figures

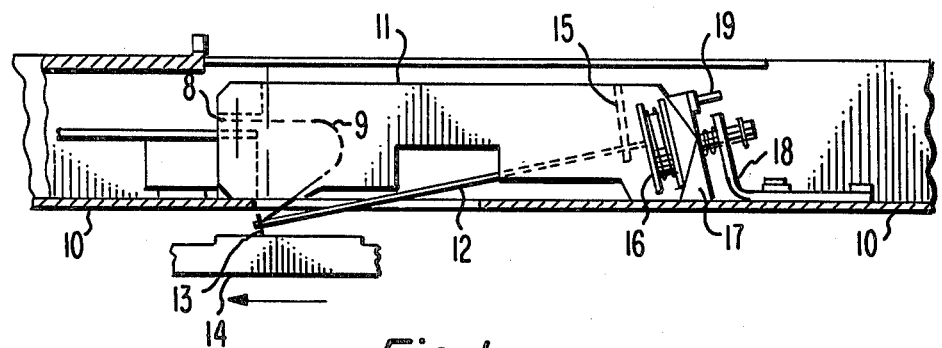
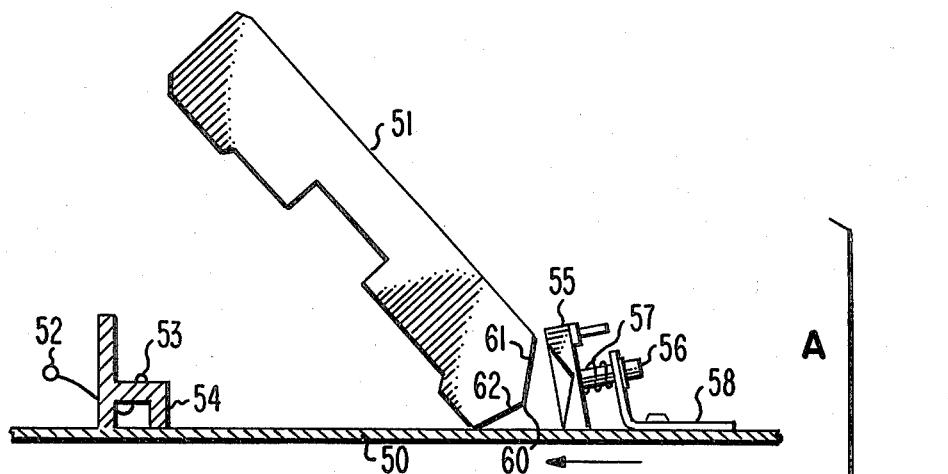
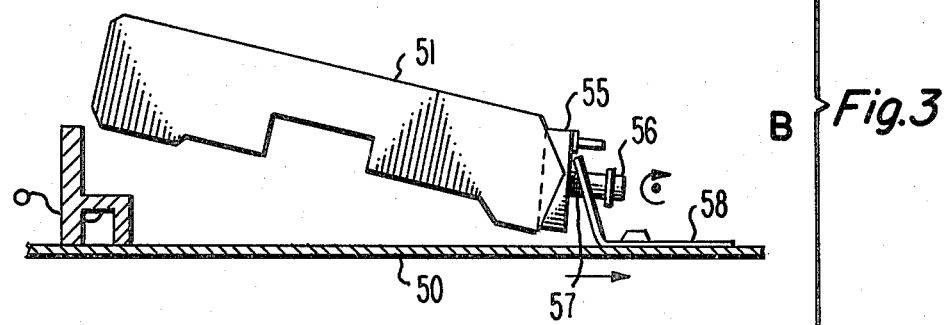
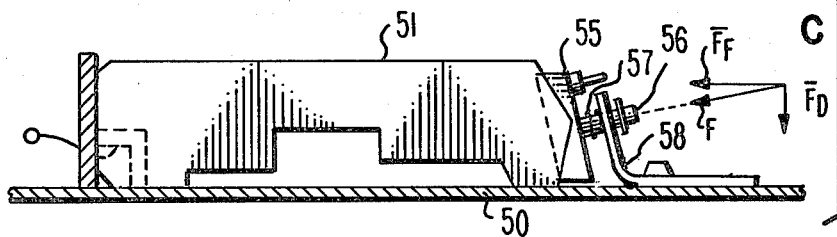
Fig.1
Fig.3

VELOCITY CORRECTION APPARATUS FOR DISC RECORD PLAYER

This invention relates to a velocity correction apparatus for a high density recording disc playback system.

Video disc players, among other record playback devices, require velocity correction systems to compensate for variations in the relative velocity created between the playback transducer (e.g., stylus) and the disc to effect signal recovery. In the capacitive video disc type systems velocity correction (armstretching) is performed by translating the stylus fore and aft along the disc tracks in which the information is recorded, in accordance with the velocity variations. Typically the stylus is secured to a relatively long stylus arm which is oriented with its long axis tangent to the information track currently being played. A solenoid type electromagnetic transducer coupled to the stylus arm has been used to produce armstretching motion.

U.S. Pat. No. 4,030,124 issued to Allen describes a system wherein the stylus-stylus arm assembly is mounted in a protective enclosure. A separate armstretcher transducer is located external to the cartridge and is connected to the stylus arm via a magnetic plate coupled to the end of the stylus. A permanent magnet is fixed to the armature of the armstretcher transducer for magnetically coupling the transducer to the magnetic plate attached to the stylus arm so that controlled movement of the armature is translated to longitudinal stylus arm motion. Using a separate armstretcher however, adds to the bulk and to the cost of the player apparatus.

The present invention provides a low cost armstretcher arrangement using an integral coil-magnet structure and includes the mechanical elements to realize coil-magnet alignment.

SUMMARY OF THE INVENTION

The present invention is an integrated armstretcher-cartridge apparatus including a permanent magnet fixed to the end of the stylus arm and a coil fixed to the cartridge supporting structure (carriage arm). The polar axis of the permanent magnet is colinear with the long axis of the stylus arm and coaxial with the coil axis.

The coil is mounted to the front face of a generally flat coil support element with its axis normal to said face. Recesses are provided in the front face of the coil support for conformally receiving the rear of the cartridge structure thereby aligning the coil with the stylus arm.

A mounting pin or lug protrudes from the back face of the coil support and is generally perpendicular thereto. The lug is slidably received in an aperture of a bracket secured to the carriage mechanism. A retaining clip is secured to the end of the lug to prevent the coil support from disengaging the bracket. A spring is included between the bracket and the coil support to apply forward and downward force to urge the cartridge to its prescribed position in the carriage and to retain the coil support in a fixed relationship with the cartridge.

The lug on the coil support is designed to loosely fit in the bracket aperture to permit limited rotation of the coil support about an axis perpendicular to the long axis of the lug so that the front face of the support will tilt away from the carriage structure to accept the cartridge in recesses provided therein.

BRIEF DESCRIPTION OF THE DRAWINGS

FIG. 1 is a pictoral drawing of a portion of a video disc carriage supporting a cartridge assembly and an armstretcher coil assembly embodying the present invention.

FIGS. 3A, 3B and 3C is a pictorial drawing of sequential steps for engaging a cartridge with the carriage having the present armstretcher coil assembled therein.

DETAILED DESCRIPTION OF THE INVENTION

Figure 2:
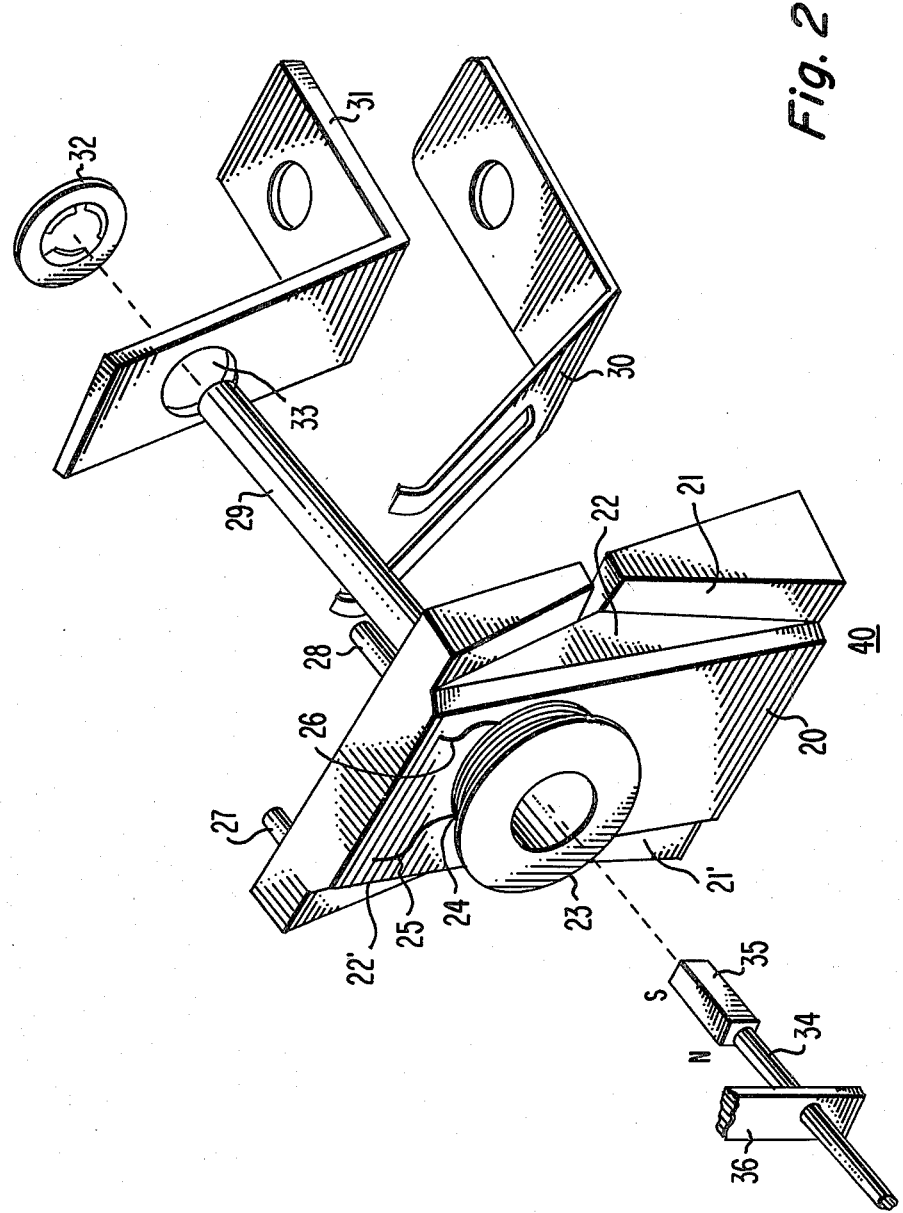
FIG. 2 is an expanded pictorial drawing of the armstretcher coil assembly.

Referring to FIG. 1, a portion of a video disc carriage assembly is shown including the signal pickup cartridge 11. The carriage 10 transports the cartridge radially (in a direction into the paper) across the disc record 14 in consonance with signal recovery from the disc. The cartridge incudes a compliant suspension 15 attached to its top wall for supporting the proximate end of a relatively long tubular stylus arm 12. Attached to the distal end of the stylus arm is the signal recovery stylus 13 shown engaging the disc record. A leaf spring 9, connected between the stylus arm 12 and the cartridge 11 provides the requisite stylus-disc interaction pressure and electrical connection between the stylus 13 and a contact terminal 8 secured to the cartrdige body 11.

A permanent magnet (not shown) with its polar axis colinear with the long axis of the stylus arm is secured to the proximate end of the stylus arm 12. The permanent magnet extends into and is coaxial with the central cavity of electromagnetic coil 16. Coil 16 is secured to the front face of the coil support structure 17. The coil support structure 17 is in turn loosely secured to the carriage 10 by the mounting bracket 18 which is fixed to the base of the carriage. The ends of the coil winding are brought to the back of the coil support structure and secured to terminals 19 (one shown) for connection to armstretcher control circuitry.

Application of armstretcher signals to terminals 19 create a magnetic field in the central coil cavity. This field attracts and repels the permanent magnet secured to the stylus arm thereby producing axial stylus arm motion. The direction of normal stylus-disc relative velocity is indicated by the arrow shown adjacent disc 14 in the figure. Longitudinal motion of the stylus arm created by the interaction of coil 16 and the permanent magnet in response to armstretcher control signals compensates for relative stylus-disc velocity variations.

Referring next to FIG. 2 the details of the armstretcher coil assembly will be described. The armstretcher coil 24 is supported on the front face 20 of the support member 40 which may for example be molded from plastic. Typically the coil will be an air core type and the coil bobbin 23 may be molded integral with the support member 40. The ends of the coil wires 25 and 26 are guided around or passed through the support member 40 and secured to terminals 27 and 28 respectively located on a rearward portion of support member 40.

The support member 40 has recesses 21 and 21' designed into the side edges of the front face 20 for conformal reception therein of corresponding extensions of the cartridge body. The recesses orient the support member 40 in a fixed relation to the cartridge and preclude both lateral and vertical movement therebetween. The coil bobbin 23 is located and oriented with respect to the recesses 21 and 21' so that the air core is coaxial with the stylus arm 34 and permanent magnet 35 when the cartridge is mated to the support. Sidewalls 22 and 22' of the frontal structure 20 closely fit between the inside surfaces of the respective cartridge sidewalls to prevent lateral motion. The rearmost surfaces of each recess is configured at an obtuse angle conformal to the rearmost extremity of the cartridge sidewalls. The depth of the recesses determines precisely the relative magnet 35—coil 23 spatial relationship, the angled shape precludes the support sliding about the cartridge when pressure is applied between the cartridge and the support.

A generally long stem or lug 29 is provided on the support member 40 rearward of the front face 20 and generally perpendicular to it. The stem loosely fits in a hole 33 provided in mounting bracket 31 which is secured to the bottom of the carriage. A retainer 32, e.g., a snap ring, is secured to the end of the stem 29 permitting the stem limited freedom to slide longitudinally in the hole 33 but preventing the stem from sliding completely out of the bracket hole 33.

A bias element 30, shown as a leaf spring in FIG. 2, but which may be a coil spring as illustrated in FIG. 1, is interposed between the bracket 31 and the support 40. The bias element is designed to produce a force directed to force the support member 40 away from the bracket 31 and thereby urge the support member into a cartridge coupled therewith.

Further features of the armstretcher assembly will now be described with respect to FIG. 3. FIG. 3 shows sequentially the interaction of the armstretcher assembly with a cartridge body 51 as the cartridge is being installed in a carriage assembly 50. The carriage contains structure 54 which includes a terminal 53 to mate with the flylead terminal located in the cartridge enclosure. The structure 54 is designed to generally guide the leftmost end of the cartridge so that the terminals come into proper alignment. Terminal 53 is connected to signal processing circuitry (not shown) via the conductor 52.

FIG. 3A illustrates the condition of the armstretcher coil support when the cartridge is removed from the carriage. The coil support 55 is pushed leftward by the spring 57, the leftwardmost position being limited by the retaining ring on the stem 56 abutting the mounting bracket 58. To install the cartridge 51, its rightmost or rear end is placed in the carriage proximate the coil support 55 while its leftmost or front end is maintained in an elevated position. The cartridge 51, while oriented in this manner is moved rightward. The rear end of the cartridge engages the coil support (FIG. 3B) and the rearmost cartridge extremities 60 enter the recesses in the coil support. Since the stem 56 is loose fitting in the mounting bracket 58, the coil support 55 rotates clockwise to a limited degree to properly mate with the elevated cartridge and moves toward bracket 58 against the spring resistance. This movement of the coil support 55 provides clearance for the front end of the cartridge to be lowered over the carriage structure 54.

The cartridge is rotated counter-clockwise and lowered into the carriage, FIG. 3C. When the cartridge is released it is urged toward structure 54 by the coil support 55 being urged by the spring 57 until the front end of the cartridge abuts the carriage structure 54.

The rightmost end of the cartridge has two beveled edges 61 and 62 which meet at a vertex 60 approximately midway between the top and bottom surfaces of the cartridge. The beveled edges provide clearance for and simplifies inserting the cartridge into the carriage. In addition the resultant shape tends to preclude relative vertical movement between the coil support and the cartridge when the vertex 60 is accommodated in the support recesses. This latter feature may be enhanced by including short tabs which extend from the vertex leftward to be received in recess extensions such as the slots cut in the sides of the support member as shown in FIG. 2.

The mounting bracket and the coil support are designed to be positioned at a slight angle with respect to the vertical. This feature causes the spring force to be directed leftward and slightly downward (see the force vector diagram in FIG. 3C). The leftward force component $F_F$ holds the cartridge in its desired forward position in the carriage. The vertical force component $F_D$ holds the rear end of the cartridge firmly against the carriage floor. (Other provision is made in the carriage for applying downward vertical force to the front end of the cartridge.)

Note that provision may be made in the carriage floor for guiding the cartridge into the coil support such as for example angled guide rails. In addition a portion of the recess sidewalls 22 in the coil support member 40 (FIG. 2) may be beveled as shown to assist guiding the inside surfaces of the cartridge sidewalls into the recesses.

What is claimed is:

1. Signal recovery apparatus for a disc record player including a cartridge having top and side walls and being removably mounted in a carriage assembly for translating the cartridge radially across a disc record, said cartridge including a signal pickup transducer attached to a first end of a longitudinal transducer arm, the second end of which is suspended within an enclosure defined by said cartridge top and side walls and proximate the rearmost end thereof, and including transducer-disc relative velocity correction apparatus comprising:

a permanent magnet fixed to the second end of the transducer arm and having its polar axis parallel with the longitudinal axis of the transducer arm;

an electromagnetic coil responsive to velocity correction signals for generating time varying magnetic fields to influence the position of said permanent magnet, said coil located proximate the second end of the transducer arm and coaxial with the polar axis of said permanent magnet;

means for supporting said coil including:

a. an element having a first surface and a second surface opposite thereto, said coil being secured to the first surface with its axis perpendicular to said first surface, said first surface having recesses astride said coil for receiving conformally therein rearmost extremities of said cartridge sidewalls thereby aligning the coil axis with the permanent magnet;

b. a stemlike member protruding from said second surface having a long axis generally parallel with the axis through said coil;

c. a bracket secured to said carriage, said bracket having an aperture for loosely receiving said stemlike member therethrough, the plane including the aperture being generally perpendicular to the long axis of the transducer arm when in its normally operative position; and d. bias means for urging said coil support means away from the bracket in the direction to seat the cartridge in its operative position.

2. The apparatus set forth in claim 1 further including a retaining means to preclude the bias means from disengaging said stemlike member from the bracket.

3. The apparatus set forth in claim 1 wherein said bias means is a leaf spring.

4. The apparatus set forth in claim 1 wherein said bias means is a coil spring.

5. The apparatus set forth in claim 1 or 2 or 3 or 4 wherein said bracket is a substantially "L" shaped member having one leg of the "L" secured to the carriage and said aperture being in the other leg of said "L" and wherein the aperture permits the stemlike member to freely slide therethrough and permits limited pivoting of the coil support thereabout.

6. The apparatus set forth in claim 1 or 2 or 3 or 4 further comprising a coil bobbin and wherein the coil bobbin is integrally molded on the first surface of said element.

7. The apparatus set forth in claim 5 wherein the rearmost extremities of said cartridge sidewalls terminate in a vertex formed by beveled edges converging from top and bottom edges of said sidewalls and wherein the recesses in said element are conformal with said beveled edges.

8. In a disc record player apparatus including a carriage for supporting a removable cartridge, said cartridge having relatively long first and second sidewalls spaced apart by a top wall and having a pickup stylus suspended therein at a first end of a longitudinal stylus arm, the second end of which is compliantly attached to the cartridge proximate a first end thereof and including pickup stylus velocity correction apparatus comprising:
 a permanent magnet mounted to the second end of said stylus arm having its polar axis aligned with the long axis of said styus arm;
 an electromagnetic coil wound on a bobbin;
 a support member having a first surface for supporting said electromagnetic coil and having a second surface opposite said first surface from which a stemlike member protrudes, said support member having recesses in said first surface for receiving therein portions of the ends of the sidewalls at the first end of said cartridge thereby aligning said electromagentic coil coaxially with the polar axis of the permanent magnet in a predetermined spatial relationship;
 a bracket secured to said carriage, said bracket having an aperture therein generally conformal to a cross section of said stemlike member, said aperture slideably receiving said stemlike member and permitting limited rotation of the support member about said bracket;
 bias means interposed between the bracket and support member for urging the support member in a direction away from said bracket and in a direction to seat the cartridge in its normally operative position.

9. The disc record player set forth in claim 8 further including:
 retaining means secured to the end of the stemlike member to preclude the support member from disengaging the bracket.

10. In a disc record player having a carriage for supporting a removable cartridge on a bottom surface thereof, said cartridge having first and second ends and having sidewalls spaced apart by a top wall forming an enclosure in which a pickup transducer is attached to a first end of a longitudinal arm, the second end of which is compliantly secured to the first end of said cartridge and having pickup transducer relative velocity compensating means comprising:
 a permanent magnet secured to the second end of the longitudinal arm with its polar axis aligned with the long axis of said arm;
 an electromagnetic coil;
 means for supporting said electromagnetic coil, said means having recesses therein for conformal engagement with structural features of the first end of the cartridge for positioning the coil in fixed coaxial relationship with the permanent magnet;
 means for slidably and rotatably securing said coil support means to the carriage; and
 bias means cooperating with said carriage and said coil support means for urging the first end of the cartridge against the carriage bottom surface and in a direction along a line from the first to the second end of the cartridge.

* * * * *